US006484002B2

(12) United States Patent
Shifley et al.

(10) Patent No.: US 6,484,002 B2
(45) **Date of Patent: *Nov. 19, 2002**

(54) DOCUMENT PRINTER/COPIER WITH DECOUPLEABLE DRUM-SUPPORT MEMBER

(75) Inventors: James D. Shifley, Spencerport, NY (US); Gregory L. Kowalski, Victor, NY (US); Christian Compera, Schonau (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/877,777

(22) Filed: Jun. 8, 2001

(65) Prior Publication Data

US 2001/0053297 A1 Dec. 20, 2001

Related U.S. Application Data

(63) Continuation-in-part of application No. 09/574,425, filed on May 19, 2000, now Pat. No. 6,263,177.

(51) Int. Cl.[7] .......... F03G 15/00
(52) U.S. Cl. .......... 399/110; 395/117
(58) Field of Search .......... 399/110, 116, 399/117, 167; 347/138, 152

(56) References Cited

U.S. PATENT DOCUMENTS

| | | | | |
|---|---|---|---|---|
| 4,128,079 A | | 12/1978 | Suzuki | 118/658 |
| 4,344,700 A | | 8/1982 | Kasama et al. | 355/3 |
| 4,530,588 A | | 7/1985 | Kimura et al. | 355/3 |
| 4,952,989 A | | 8/1990 | Kawano et al. | 355/210 |
| 5,155,506 A | | 10/1992 | Yamaguchi | 346/160.1 |
| 5,640,229 A | | 6/1997 | Nakahara | 399/119 |
| 6,263,177 B1 | * | 7/2001 | Shifley et al. | 399/110 |

FOREIGN PATENT DOCUMENTS

| | | | |
|---|---|---|---|
| JP | 55-88090 | * | 7/1980 |
| JP | 4-307582 | * | 10/1992 |

OTHER PUBLICATIONS

U.S patent application Ser. No. 09/474,352, filed Dec. 29, 1999, entitled Pparatus for Positioning Work Stations In A Document Printer Copier.

U.S patent application Ser. No. 09/574,054, filed May 8, 2000, entitled Pin Mount for Optical Writer/Image–recording Element In A Document Printer/Copier.

U.S patent application Ser. No. 09/574,275, filed May 19, 2000, entitled Cantilever Drum Mount for Document Printer/Copier.

U.S patent application Ser. No. 09/574,447, filed May 19, 2000, entitled Image Transfer Drum Fo Rdocument Printer/Copier.

* cited by examiner

*Primary Examiner*—Joan Pendegrass
(74) *Attorney, Agent, or Firm*—James D. Leimbach

(57) ABSTRACT

A document printer/copier comprises a pair of drum-support members for rotatably supporting an image-recording drum and, optionally, an intermediate image-transfer drum. At least one of such drum-support members is adapted to be decoupled from the drum(s) it supports and be moved to a position within the machine frame in which it does interfere with the replacement of the drum(s)'s outer layer. Preferably, such member comprises a selectively energizable clamp which, when energized, clamps onto an axle bearing of a drum and thereby supports the drum for rotation. When de-energized, the clamp releases the drum bearing, enabling the drum-support member to be slid axially along the drum axis to a position spaced from the drum axle, and thereafter pivoted to a position spaced from the drum axis where it does not interfere with drum servicing and/or replacement.

20 Claims, 11 Drawing Sheets

DOCUMENT PRINTER/COPIER WITH DECOUPLEABLE DRUM-SUPPORT MEMBER

CROSS-REFERENCE TO RELATED APPLICATIONS

This is a continuation-in-part of U.S. application Ser. No. 09/574,425, filed May 19, 2000, now U.S. Pat. No. 6,263,177 entitled "Document Printer/Copier With Decoupleable Drum-Support Member, in the names of James D. Shifley et al.

Reference is made to the commonly assigned U.S. Patent Applications, the respective disclosures of which being incorporated herein by reference:

(1) U.S. application Ser. No. 09/474,352, filed on Dec. 29, 1999 and entitled "Apparatus for Positioning Work Stations in a Document Printer/Copier".

(2) U.S. application Ser. No. 09/574,054, filed concurrently herewith and entitled "Pin Mount for Optical Writer/Recording Element in a Document Printer/Copier".

(3) U.S. application Ser. No. 09/574,275, filed concurrently herewith and entitled "Cantilever Drum Mount for Document Printer/Copier".

(4) U.S. application Ser. No. 09/574,447, filed concurrently herewith and entitled "Image Transfer Drum for Document Printer/Copier".

FIELD OF THE INVENTION

The present invention relates to field of document printing and copying. More particularly, it relates to improvements in methods and apparatus for precisely positioning the various work-stations of a document printer/copier, e.g., an electrophotographic printer, relative to (i) the photosensitive surface of an image-recording drum on which toner images are formed, and, optionally, (ii) the non-stick (abhesive) surface of an intermediate image-transfer drum to which toner images are transferred from the image-recording drum before being ultimately transferred to an image-receiver sheet.

BACKGROUND OF THE INVENTION

Automated electrophotographic copiers and printers have been known for nearly fifty years. Copiers and printers differ only from an input standpoint, copiers being adapted to receive hard copy input, whereas printers are adapted to receive an input in electronic form, e.g., from a computer terminal. Both carry out the basic electrophotographic imaging process of uniformly charging a photoconductive layer with electrostatic charge, imagewise exposing the charged layer to radiation adapted to discharge the layer, thereby leaving behind a latent charge image, and applying pigmented electroscopic particles (toner) to the charge image to render it visible. Most often, the toner image so formed is transferred to a receiver sheet whereupon the toner image is permanentized by heat and/or pressure. Optionally, for example, to extend the lifetime of the photoconductive recording element, the toner image formed on the image-recording drum is transferred to an intermediate transfer drum or the like before it is again transferred to the receiver sheet. In the case of full color copying and printing, multiple color-separated toner images (e.g., cyan, magenta, yellow and black) are produced by the above process and transferred in registration to a receiver sheet.

Since the inception of electrophotographic printers/copiers, the "holy grail" for many manufacturers has been to produce images of photographic quality, both monochromatic and full color. As will be appreciated, the quality of a full color image is determined not only by the respective qualities of each of the color-separated toner images formed on the photoconductive recording element(s), but also by the degree with which such images can be transferred from the recording element(s) and brought into perfect registration on the image receiver sheet. Such image quality of the color-separated images and the registration thereof, in turn, depend in large part upon the precision with which the various work-stations or subsystems that carry out the electrophotographic process can be physically placed relative on the surface of the recording element. Thus, various schemes have been proposed and used in the past that address this technical problem.

While focusing on image-quality and registration issues, printer manufacturers are ever mindful of lowering manufacturing and service costs. Thus, substantial efforts have been made to simplify service and maintenance procedures so that the need for service calls by highly trained technicians and specialists can be minimized. Ideally, for example, all of the major workstations of the printer, e.g. the charging, exposure, development, transfer and cleaning stations, as well as the recording element itself, should be replaceable by the end user or customer with no sacrifice being made to the ultimate image quality. Even where the services of a trained technician are required, the time to implement such replacements should be minimal. The achievement of this goal not only requires that each of the printer work-stations be modularized so as effect a "plug and play" concept, but also requires that a very precise and highly reliable work station-registration scheme be designed so that each work station, upon being removed from the printer frame for servicing and/or replacement, can be returned to within a few microns of its nominal position. In the case of high quality color printing, the respective placements of the printer workstations is particularly critical and skilled servicing personnel are usually required to make the major sub-system changes. Obviously, the need for service assistance should be minimized.

In the above-referenced U.S. application Ser. No. 09/474,352, a work station registration scheme for an electrophotographic printer is disclosed in which a plurality of dowel pins on the printer frame serve to locate both a photoconductive drum assembly and an image transfer drum assembly. Each drum assembly comprises a pair of drum-support members, commonly referred to as "spiders," located at opposite ends of the drum. Each spider contains a centrally located bearing for rotatably supporting a drum axle, and a plurality of outwardly extending mechanical fiducials, e.g. bullet-shaped members, which are adapted to mate with complimentary structure, e.g., V-notched blocks, mounted on each work station to precisely locate and space the work-stations relative to the drum's photoconductive surface. When it comes time to replace the image-recording and/or transfer drums, the work-stations are retracted from their respective positions adjacent the drum surface, thereby providing clearance for drum removal, and the entire drum assembly, including the spider members, are slid axially through an opening in the front wall of the printer frame. The entire drum assembly is then returned to the manufacturer's facility where the assembly is disassembled and a new drum can be substituted for the worn drum. To install a new drum assembly, the reverse process is carried out, the drum assembly being moved axially inward into the printer frame, until the spiders engage and are seated upon the dowel pins. Thereafter, the workstations are moved toward the drum surface and their respective operative positions. In a similar manner, each of the individual work-stations may be removed from the printer housing, leaving behind, when the drum assembly has been removed, a frame that is totally void of any major components. Only the registration dowel pins remain in the frame, and the entire printer can be reassembled with great precision based on the location of these pins.

While the above-described apparatus fulfills the work station-registration needs for high quality color printing, it may be viewed as a relatively costly and labor-intensive solution. For example, to replace the drum surface, the entire drum assembly, which including the relatively costly drum-support members (spiders) and axles, must be replaced. This requires removal of a relatively heavy subsystem from the printer housing and shipment of such subsystem back to the manufacturing for refurbishing. Since most of the drum assembly components do not require replacement, these components undergo unnecessary shipping and handling during which time they may be damaged or have parts misaligned. This disadvantage is exacerbated by the weight of such components. Ideally, only those components of the drum assemblies that actually need replacement (typically the outermost layer of the drum) should be removed from the printer housing and the remaining components should stay in place for the life of the printer.

SUMMARY OF THE INVENTION

In view of the foregoing discussion, an object of this invention is to provide an improved system for precisely and repeatedly positioning the various workstations of an electrophotographic printer relative to an image recording and/or image-transfer drum.

Another object of this invention is to provide an improved document printer/copier in which a work station-registration and drum-support member comprising a drum assembly mounted within a printer/copier frame can be selectively de-coupled from the drum assembly and moved within the printer/copier frame to a location providing service access to the outer surface of an image-recording drum and/or image-transfer drum.

According to one aspect of the invention, a document printer comprises (i) a frame including a front frame plate, (ii) at least one reference pin or the like extending from the front frame plate at a predetermined location, (iii) an image-recording drum having an outer photosensitive surface and front and rear axles extending outwardly from opposing ends of the drum along an intended axis of rotation, (iv) a plurality of work-stations for producing transferable visible images on the drum's photosensitive surface, and (v) a front drum-support member mounted on the front frame plate and precisely located thereon by the reference pin extending from the front frame plate, such front drum-support member having a set of mechanical fiducials for locating various work-stations relative to the drum surface. According to the invention, the front drum support member has a selectively energizeable clamping mechanism for selectively engaging a bearing on the front drum axle, whereby the front drum-support member can either rotatably support the front drum axle for rotation, or be decoupled therefrom so that the drum can be removed from the printer frame. Preferably, the front drum-support member is movably mounted on the front frame plate for movement between a first position in which its associated clamping mechanism is positioned to engage the bearing on the drum's front axle, and a standby position in which the front drum-support member is sufficiently spaced from the drum's front axle to enable servicing of the drum, e.g., to enable replacement of the drum's outer photosensitive layer. Preferably, the printer of the invention further comprises an intermediate image transfer drum having opposing front and rear axles extending outwardly from opposite ends, and the front drum-support member is further provided with a second selectively energizeable clamp for selectively engaging a bearing on the front axle of the transfer drum. Also preferred is that the printer further comprises a rear drum-support member rigidly mounted on a rear frame plate of the printer frame and precisely located thereon by reference pin extending from the rear frame plate. Wherein this aspect of the present invention employs reference pins, other mechanical reference surfaces are envisioned such as a V-block, a flat surface, or a hole that mates with a member in the drum support member, which can all be used as a reference surface. Such rear drum-support member includes (a) a bearing for rotatably supporting the rear axle of the image-recording drum, and (b) a second set of fiducials that cooperate with the fiducials on the front drum-support member for locating the various work-stations of the printer relative to the drum surface. Preferably, the rear drum-support member comprises a selectively energizeable clamp, which serves to releasably and rotatably support the rear axle of the image-transfer drum.

According to another aspect of the invention, new drum-support members of the above type are provided. Rather than being an integral part of the drum assembly that stay with the drum assembly when it comes time to replace the drum surface, the drum-support members of the invention are adapted to remain in the printer housing while only the outer surfaces of the drum(s) are replaced or serviced. Preferably, the front drum-support member of the invention comprises a selectively energizeable clamp which, when energized, clamps about the outer race of an axle bearing that serves to rotatably mount the image-recording drum. When so clamped, the drum-support members become part of the drum assembly, and a plurality of reference fiducials located at predetermined positions about the periphery of the drum-support member serve to position the various work-stations of the printer. When unclamped, the drum-support members are de-coupled from the drum(s). Mounting structure on the front drum-support member enables such member to be (i) slided axially (relative to the drum's axis of rotation) to suitably displace the member from the drum, and (ii) pivoted to a location laterally spaced from the drum axis. According to a preferred embodiment, the front drum-support member further comprises a bearing for rotatably supporting one end of the image transfer drum in a cantilever fashion and a selectively energizeable clamp which, when energized, clamps about the outer race of an axle bearing serving to rotatably mount an image-transfer drum. Preferably, the rear drum-support member is adapted to be rigidly connected to the rear frame plate of the printer frame.

As indicated above, an advantageous technical effect of the invention is that the most significant technical benefits of the work-station registration scheme disclosed in the above-referenced U.S. application Ser. No. 09/474,352 have been preserved while the cost of implementing such a scheme is minimized by virtue of the fact that the most costly components of the drum assembly (i.e., the drum-support members ("spiders") and drum axles) are never removed from the printer and can remain with the printer throughout its useful life. Another advantage of the invention is that the end user can gain access to the image recording and transfer drums for servicing without having to remove and replace relatively heavy sub-assemblies.

The invention and its advantages will be better understood from the ensuing detailed description of preferred embodiments, reference being made to the accompanying drawings in which like reference characters denote like parts.

DETAILED DESCRIPTION OF PREFERRED EMBODIMENTS

Figure 1:
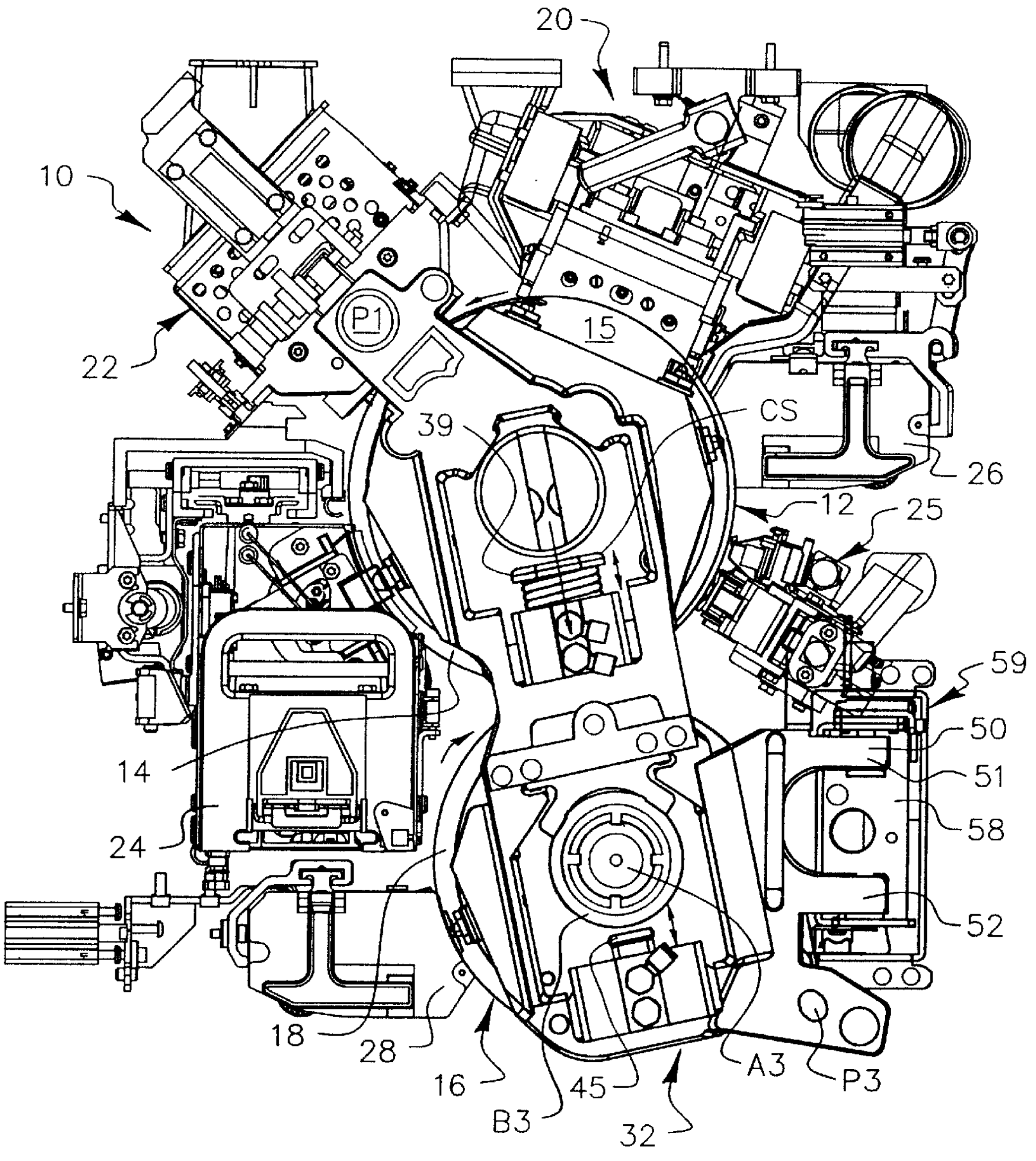
FIG. 1 is a side elevation of a portion of an electrophotographic printer embodying the invention.

Referring now to the drawings, FIG. 1 shows a major portion of an electrophotographic printer 10 embodying the present invention. While the apparatus shown is adapted to produce monochromatic (one color) images, it may be one of several identical printing modules, each being adapted to produce one of the several color-separated images comprising a multicolor print. As shown, printer 10 comprises an image-recording drum 12 having a photoconductive outer surface 14 on which toner images are formed in a conventional manner. As discussed below, surface 14 is part of a replaceable photoconductive tube comprising, for example, an aluminum sleeve, about 8 mm in thickness, having an outer coating of an organic photoconductive material. The photoconductive tube is supported at opposite ends by a pair of circular gudgeons 15,15' which, in turn, are supported by a drum shaft (shown in FIG. 7). The forward gudgeon 15 is releasably attached to the drum shaft so that, when the gudgeon is removed from the drum shaft, the photoconductive tube can be slid axially and thereby be removed from the printer frame and, if necessary, be replaced. The printer also comprises an intermediate image-transfer drum 16 with a compliant adhesive (non-stick) sleeve 18 to which toner images formed on the photoconductive outer surface of image-recording drum 12 are transferred prior to being re-transferred to a receiver sheet (not shown). Like the image-recording drum, the image-transfer drum is structured so that its outer layer can be removed and replaced in the field, i.e., at the customer site. Briefly, the drum 16 comprises a cylindrical mandrel 17 (shown in FIG. 7), which supports a removable adhesive sleeve. Details of the image-transfer drum are disclosed in the above-referenced U.S. application Ser. No. 09/574,447.

Briefly, toner images are formed on the photoconductive surface of image-recording drum 12 by rotating the drum in a counter-clockwise direction (as viewed in FIG. 1) past a series of image processing or work-stations that sequentially operate on a desired portion of the drum's photoconductive outer surface to produce a visible toner image. These image processing stations include a corona charging station 20 for uniformly charging the photoconductive surface 14 with electrostatic charges, a solid-state print head or optical writer 22 for imagewise exposing the charged photoconductive surface, line-by-line, to actinic radiation, thereby selectively dissipating the uniform charge and leaving behind a latent electrostatic charge image, and a toning station 24 for developing the charge image with pigmented electroscopic toner particles. The toner image thus formed is then transferred to the outer surface of the image-transfer drum 16, and residual toner on the image-recording drum 12 is removed by a pre-clean corona charger 25 an a cleaning station 26. Upon re-transferring the toner image on the intermediate transfer drum 16 to an image-receiver sheet (not shown), the surface of drum 16 is cleaned by a second cleaning station 28. Preferably, each work station, with the exception of the optical writer is mounted for slight movement (e.g. about 5 to 7 mm.) towards and away from its respective operative position adjacent the drum surface (shown in FIG. 1) to provide adequate clearance for installation and replacement of the processing stations. During such installation, as explained below, these processing stations are moved substantially parallel to drum's respective axis of rotation, through an opening 30 in the front mechanism plate FP of the printer frame F (shown best in FIG. 2).

Figure 2:
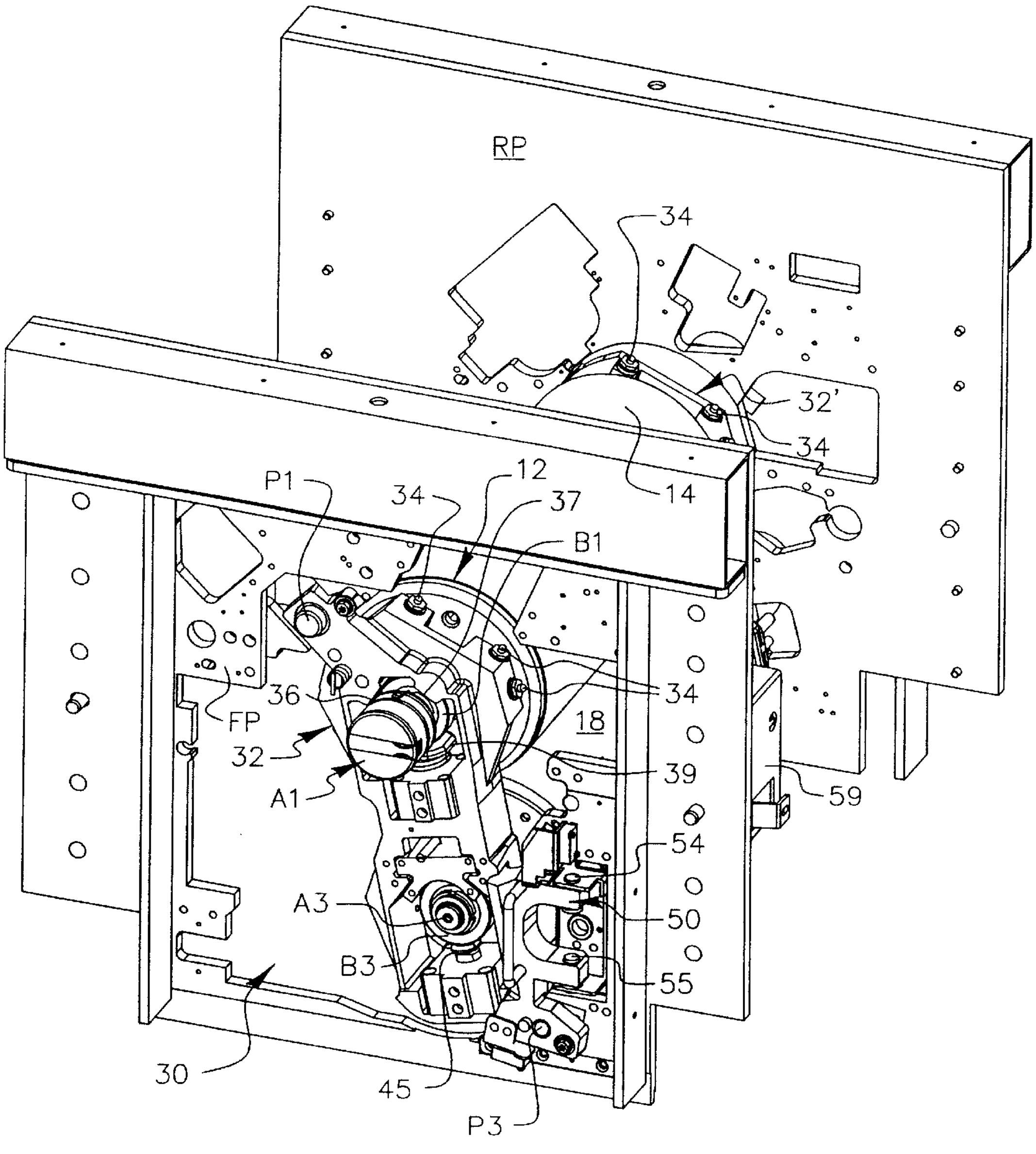
FIG. 2 is a perspective view of a portion of the apparatus shown in FIG. 1.
Figure 4:
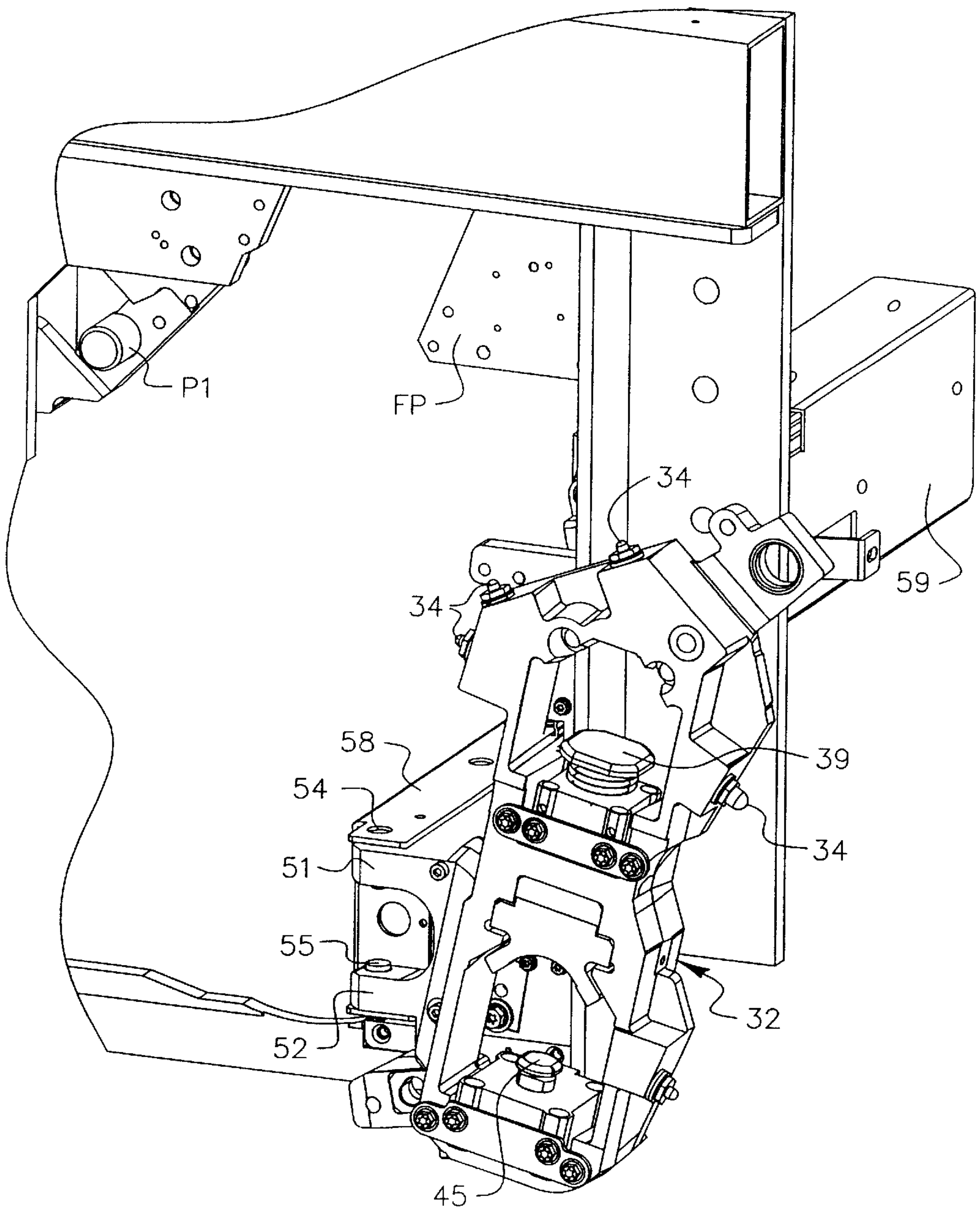
Figure 5:
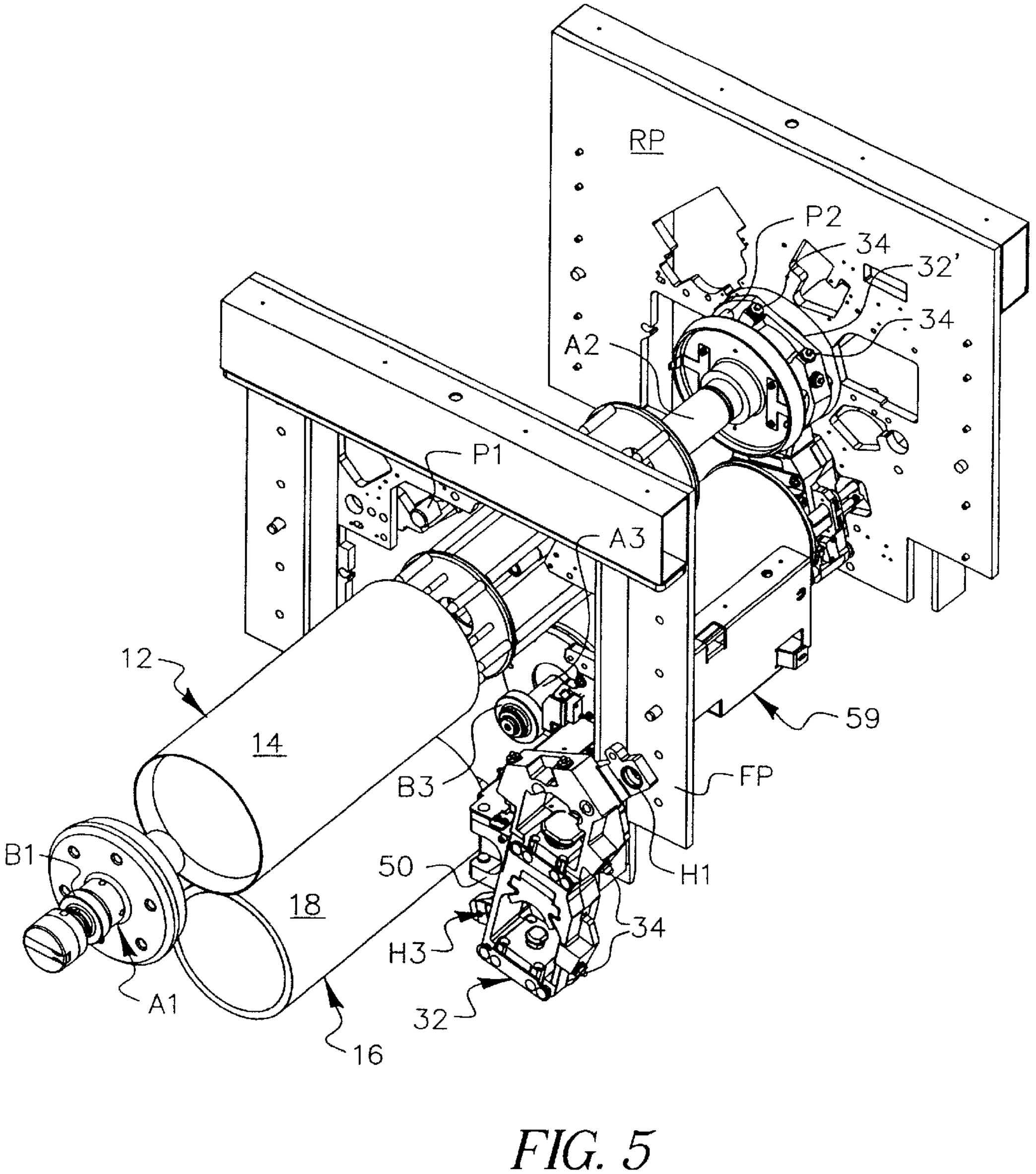
FIG. 5 is a perspective view of a portion of the FIG. 1 apparatus showing the outer layers of the image recording and image-transfer drums removed.
Figure 7:
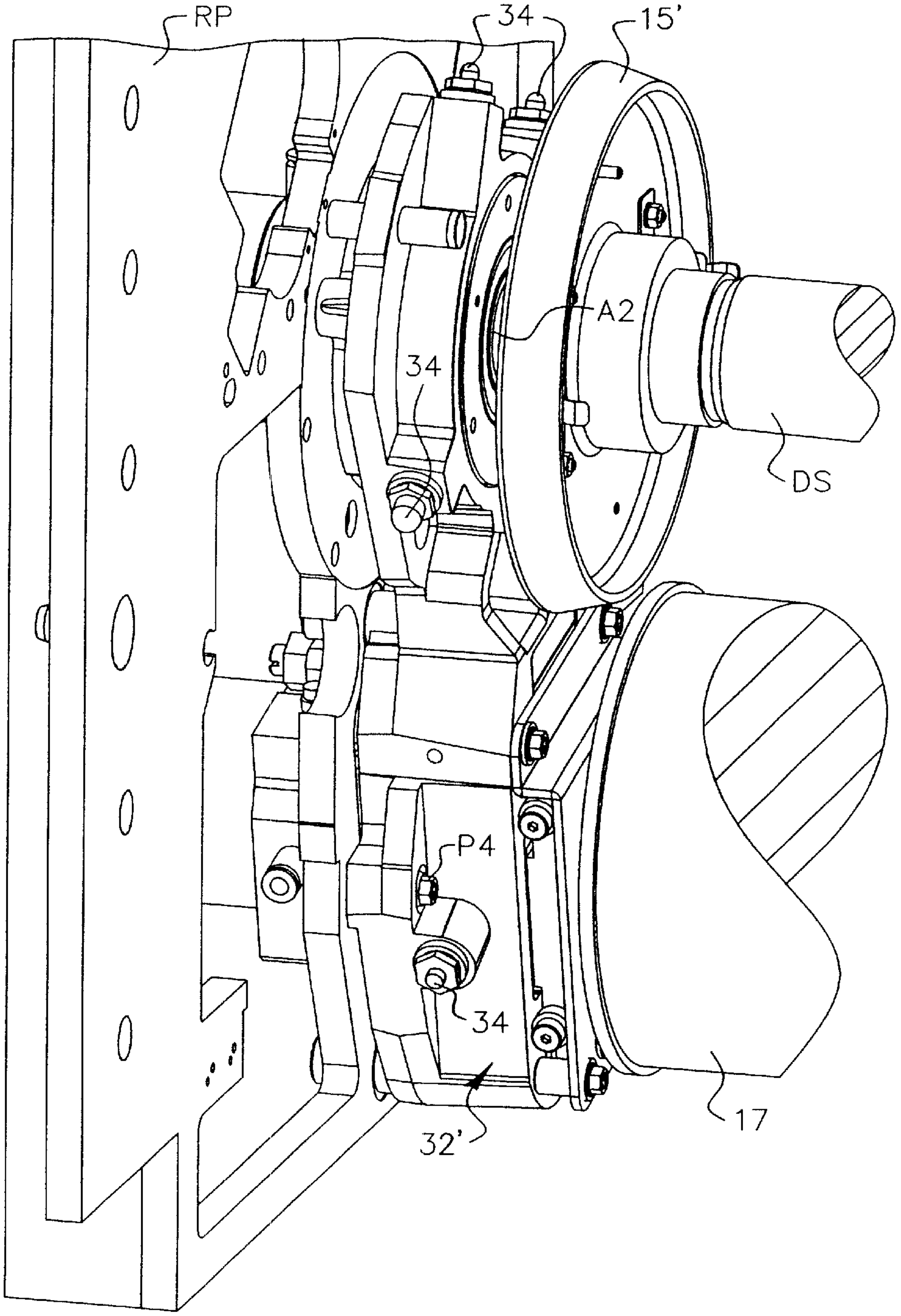
FIGS. 7–10 are front perspective, rear perspective, cross-sectional, and side elevational views, respectively, of portions of the rear drum support shown in FIG. 6B.
Figure 8:
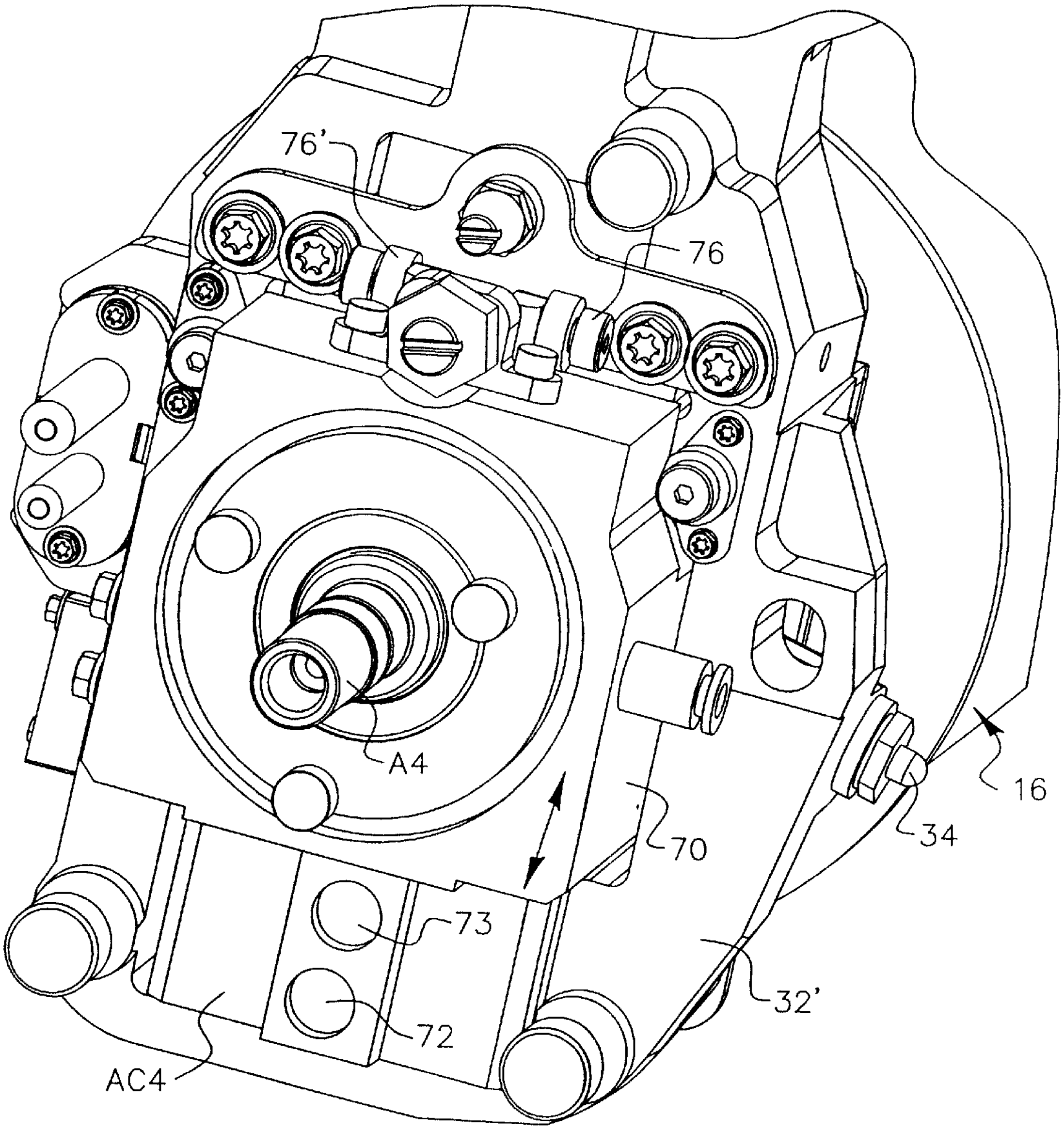
Figure 9:
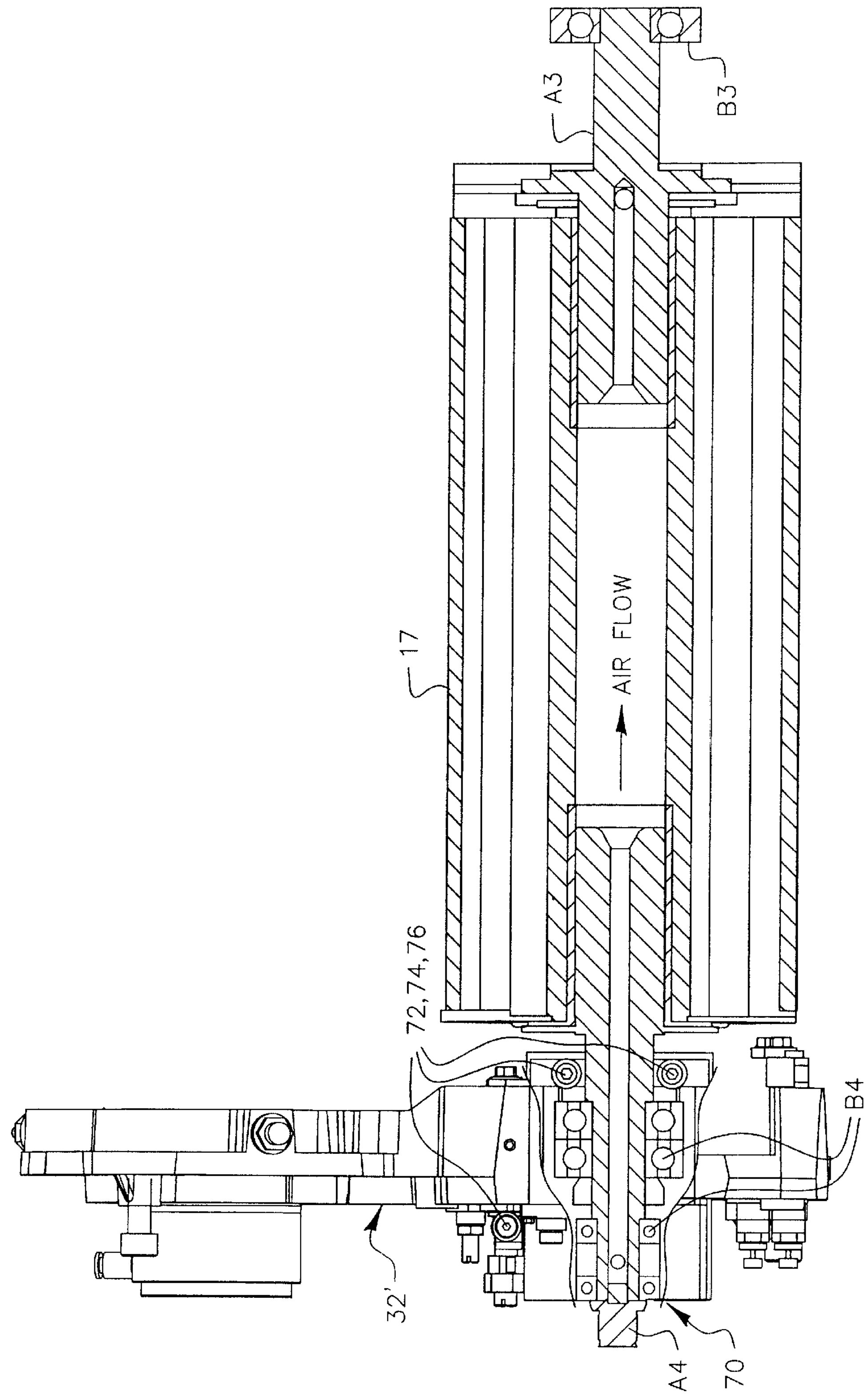
Figure 10:
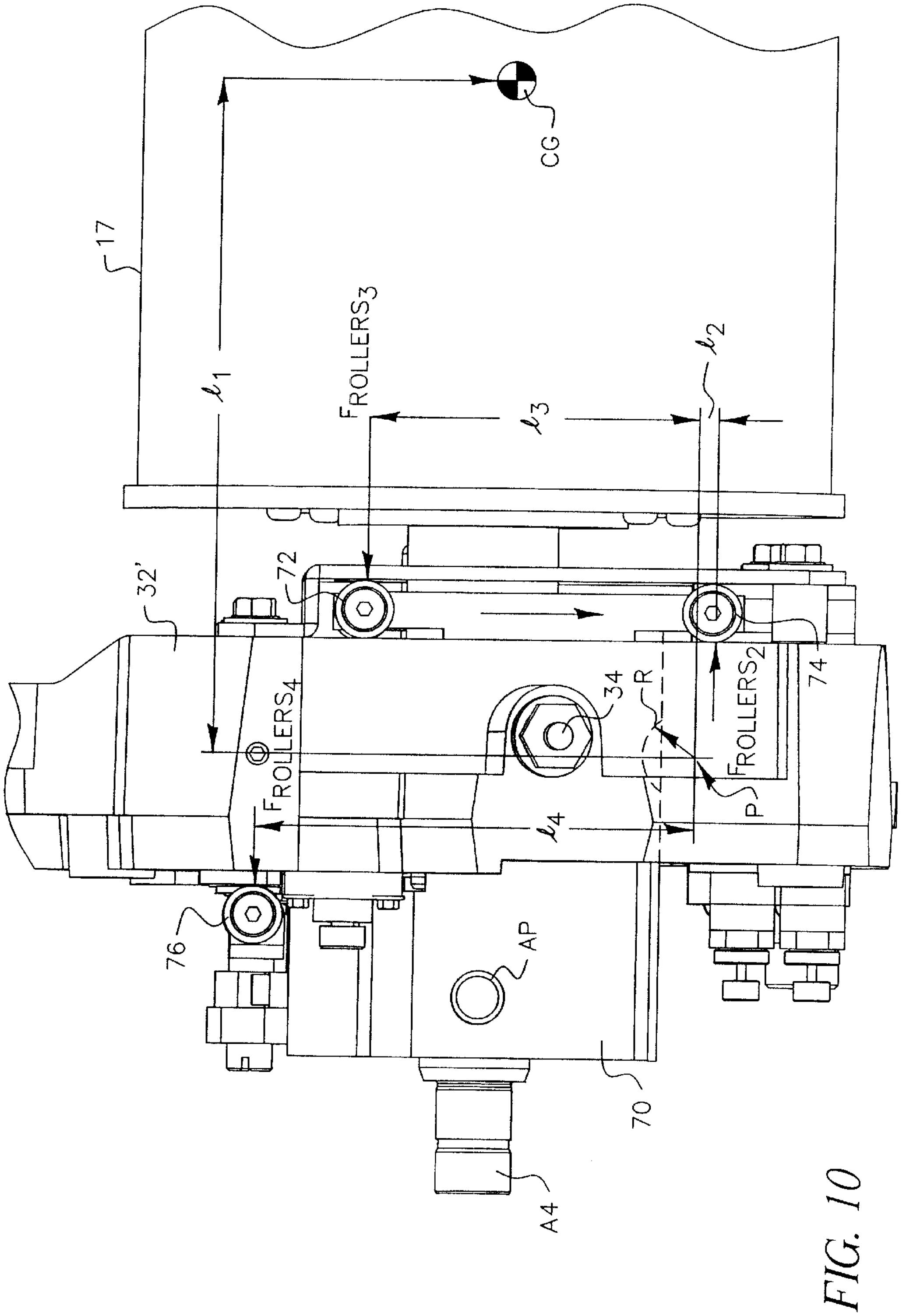

FIGS. 2 and 5 are a perspective view of the FIG. 1 apparatus with the workstations 20, 22, 24, 26 and 28 removed. FIG. 5 shows a pair of dowel or "reference" pins P1,P2 mounted on the front and rear plates, FP, RP, respectively of the printer frame. As disclosed in the above-referenced U.S. application Ser. No. 09/574,054 these reference pins are engaged by mounting blocks located at opposite ends of the optical writer 22 and thereby serve to control the focus position of the writer relative to the drum's photoconductive surface. As discussed below, pins P1–P4 further serve to precisely locate drums 12 and 16 within the printer frame by precisely positioning a pair of drum-support members used to rotatably support the drums within the printer frame. Wherein this aspect of the present invention employs reference pins , other mechanical reference surfaces are envisioned such as a V-block, a flat surface, or a hole that mates with a member in the drum support member, which can all be used as a reference surface. Now in accordance with a preferred embodiment of the invention, drums 12 and 16 are rotatably supported by a front and rear drum-support members 32, 32'. As best shown in FIGS. 5 and 7, the rear drum-support member 32' is rigidly connected to the rear frame plate RP of the printer frame and is precisely located thereon by the reference pins P2 and P4. As described in more detail below and in the above-referenced U.S. application Ser. No. 09/574,275, rear member 32' serves to rotatably support both drums 12 and 16 by their respective rearward-extending axles A2 and A4. Moreover, rear drum-support member supports the image-transfer drum 16 so that it may be moved towards and away from the image-recording drum 12, the rotational axis of which remains stationary. The front drum-support member 32, in contrast with the rigidly mounted rear member, is movably mounted on the front frame plate FP of the printer frame for movement between an operative position (shown in FIG. 2) in which it is capable of rotatably supporting both of the respective forwardly-extending portions of the axles A1 and A3 of drums 12 and 16, and a standby position (shown in FIGS. 4 and 5) in which it is sufficiently spaced from the drum axles to enable, for example, the outer surfaces of the drums to be accessed for service and/or replacement. Each of the drum-support members 32,32' is provided with a plurality of outwardly extending fiducials 34 which, together with similarly located fiducials on the other drum-support member serve to precisely locate the various work-stations of the printer relative to the respective outer surfaces of the drums. This type of workstation registration scheme is disclosed in more detail in the above cross-referenced U.S. application Ser. No. 09/474,352.

Figure 6A:
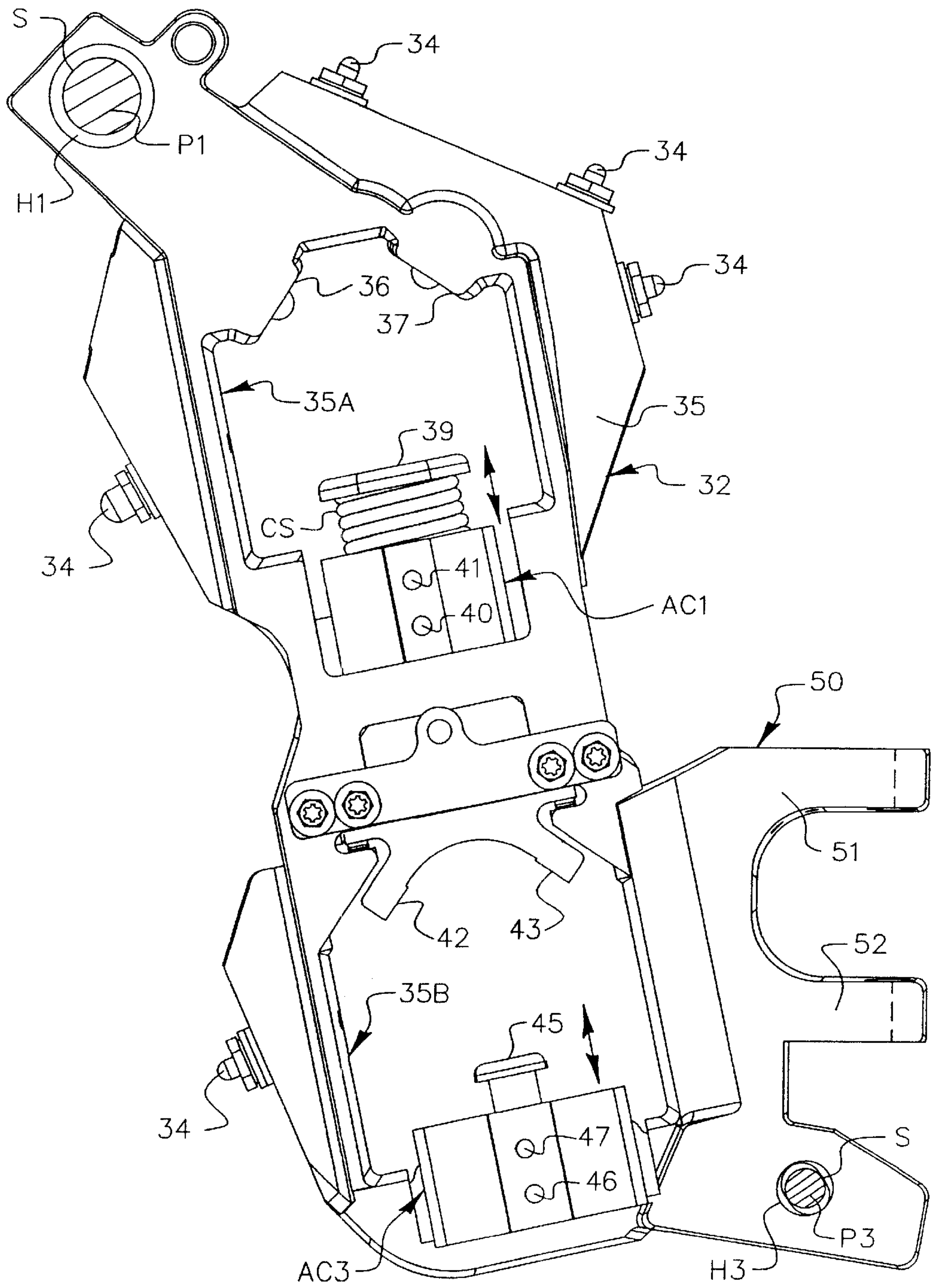
FIGS. 6A and 6B are enlarged side elevations of the front and rear drum supports of the FIG. 1 apparatus.
Figure 6B:
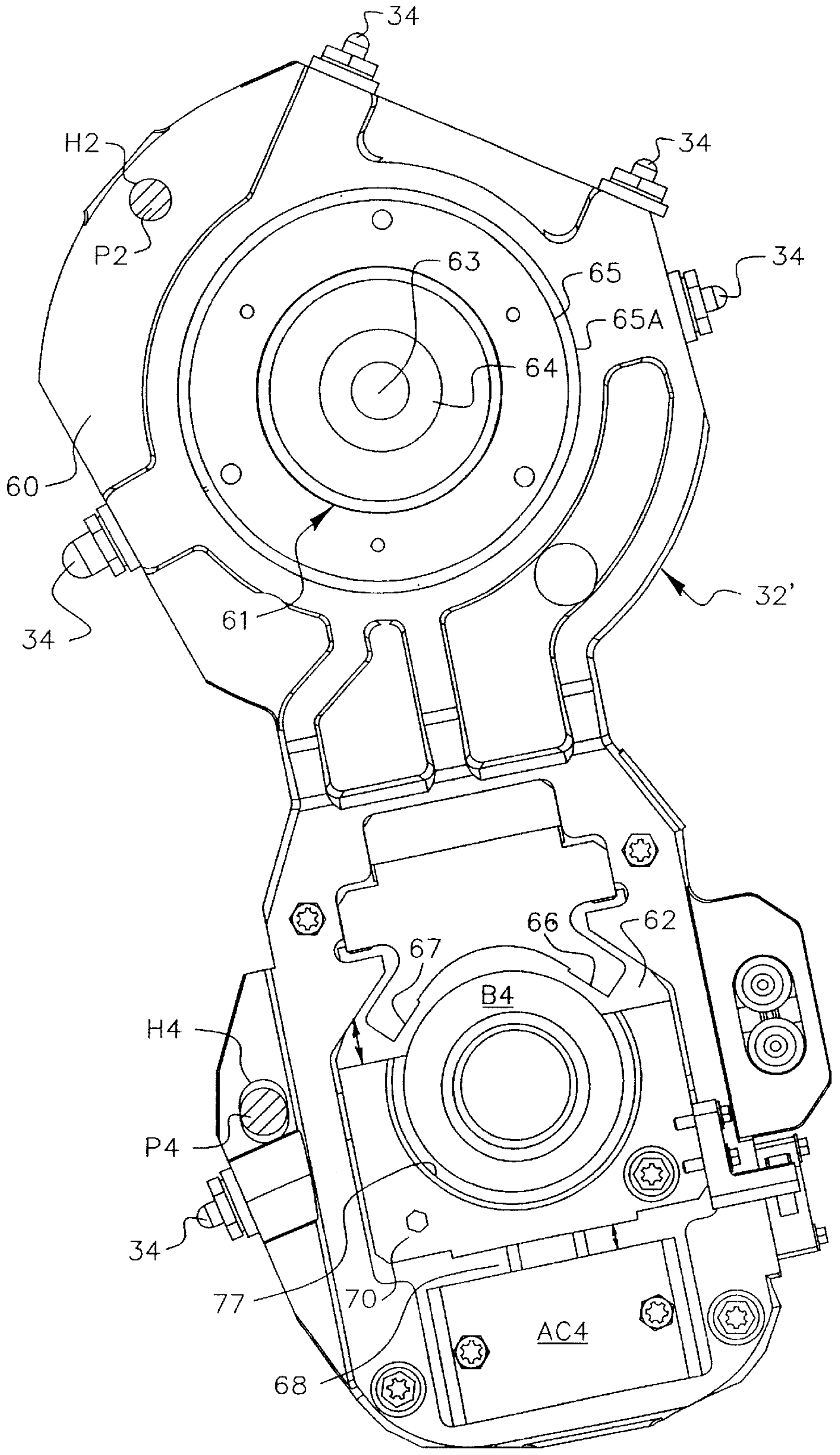

Referring additionally to FIGS. 6A and 6B, the front drum-support member 32 comprises a housing 35 that is preferably made of aluminum and has, generally speaking, a "figure eight" configuration. A circular hole H1 and a slot H3 are provided in housing 35 for receiving pins P1 and P3 carried by the printer's front frame plate FP. Each hole or slot is provided with a sleeve S having a tapered forward edge for facilitating the entry of pins P1 and P3. The upper opening 35A of housing 35 is adapted to receive and rotatably support the front portion of the image-recording drum axle A1, while the lower opening 35B is adapted to receive and rotatably support the front portion of the intermediate transfer drum axle A3. Opening 35A is provided with a pair of reference surfaces 36,37 arranged at 90 degrees with respect to each other, thereby defining a V-notch for receiving the front axle bearing B1 of the image-recording drum 12. Mounted within housing 35 is a selectively energizable, double-acting air cylinder AC1 having a movable actuator 39 extending into opening 35A. When air is applied through a port 40 of the air cylinder, the actuator moves in a direction towards the apex of reference surfaces 36,37. Thus, when the movably-mounted drum-support member 32 is located in its operative position as shown in FIG. 2, the top (free end) of actuator 39 will engage the bottom portion of the outer race of drum bearing B1 as the actuator moves into opening 35A. As actuator 39 continues to move towards reference surfaces 36,37, it operates to lift the drum axle A1 until the axle bearing B1 contacts the reference surfaces 36,37. At this time, the air cylinder actuator operates collectively with reference surfaces to position the drum axle at a nominal position, that being one that is precisely located with respect to the work station-locating fiducials 34. A compression spring CS assists in maintaining an upward force on the drum axle. When air is applied to port 41, actuator 39 begins to lower (i.e., withdraw into housing 35) and thereby move away from reference surfaces 36,37. As actuator 39 continues to withdraw into housing 35 (e.g., a distance of about 3 or 4 mm.), it eventually looses contact with bearing B1 and, at this time, the image-recording drum 12 is totally supported, in a cantilever fashion, by the rear drum-support member 32'. Owing to a slight play in a rear axle bearing B2 carried on the rear axle A2 of drum 12, the forward, unsupported end of drum 12 sags about 1 mm., causing the upper portion of bearing B1 to lose contact with reference surfaces 36,37. Owing to this sagging of the forward end the image-recording drum and the resulting lose of contact between the forward bearing B3 and the V-notch defined by the reference surfaces, drum support 32 is allowed to move axially, as discussed below, unimpeded by any frictional forces between the surfaces that normally support the drum axle for rotation.

Like opening 35A of housing 35, opening 35B is also provided with a pair of reference surfaces 42,43 for locating the front axle A3 of the intermediate image-transfer drum 16. A second air cylinder AC3 contained in housing 35 has a selectively movable actuator 45 that is positioned to engage bearing B3 (best shown in FIG. 5) on the forward end of drum axle A3 when drum-support member is in its operative position. Thus, when actuated by applying air through port 46, air cylinder AC3 operates to advance actuator 45 towards the apex of reference surfaces 42,43; in doing so, the actuator engages the lower peripheral portion of the outer race of bearing B3 and raises the top part of the bearing into engagement with the V-notch defined by reference surfaces 42 and 43. When so positioned, and when the transfer drum has been raised by the rear drum-support member 32' to its operative position (as explained below), the outer surface of the transfer drum engages the photoconductive surface and applies sufficient pressure to establish a desired transfer nip of predetermined width (e.g., 5 mm). When air is applied to the lower port 47 of air cylinder AC3, actuator 45 lowers (i.e., withdraws into housing 35). As actuator 45 lowers, the drum axle it supports moves with it, thereby causing the outer surface of the image-transfer drum to lose contact with the image-transfer drum. Note, at the same time the front end of the image-transfer drum is lowered (or raised) the rear end of the drum is moved a corresponding difference via the rear drum-support member 32', as explained below. When actuator 45 has been lowered by a distance of about 5 mm., it loses contact with drum bearing B3. At this point, the image-transfer drum 16 is totally supported, in a cantilever fashion, by drum-support member 32'.

Figure 3:
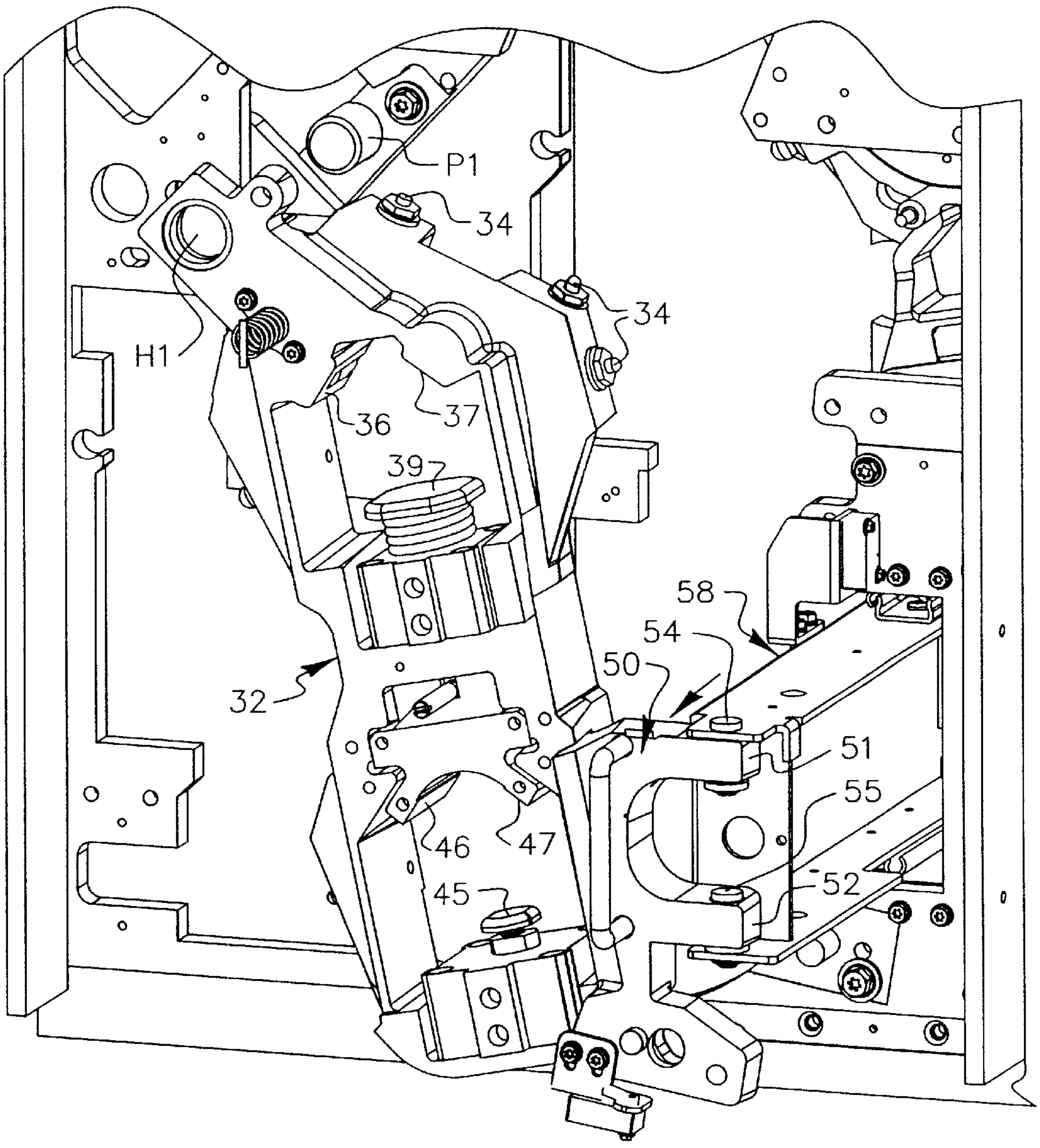
FIGS. 3 and 4 are enlarged perspective views of a movably mounted drum support member in two different positions.

Thus, as explained above, the front drum-support member 32, by virtue of its selectively energizable clamps, is adapted to either (i) be an integral part of the drum assemblies and function to rotatably support the respect drum axles of drums 12 and 16, as occurs when the actuators 39 and 45 are in their respective UP positions, or (b) be de-coupled from the drum assemblies, as occurs when the actuators are in their respective DOWN positions. As noted earlier, it is important to the invention that drum-support member 32 not only be able to be decoupled from the drum assemblies, but also be movable to a position within the printer frame where it does not interfere with the servicing of the respective drum surfaces. Thus, in addition to carrying structure for precisely positioning and rotatably supporting the axles of drums 12 and 16, the front drum support member 32 is provided with structure by which it can be slid in a direction parallel to the respective axes of rotation of the drums, whereby it may be moved forwardly of the respective drum axles Al and A3, as well as be pivoted about an axis normal to the drum axes, whereby member 32 can be substantially displaced from the drums. As shown in FIGS. 1–4 and 6A, housing 35 has an integral yoke portion 50 comprising a pair of spaced arm members 51,52. The arm members of yoke 50 are pivotally mounted on a pair of pivot pins 54,55 carried by an end of a movable carriage 58 that is slidably mounted in a track 59 extending between the printer frame plates FP and RP. Pivot pins 54,55 share a common axis that is perpendicular to the axes of the drums. Track 59, on the other hand, extends in a direction parallel to the drum axes. Thus, when the respective air cylinders of drum-support member 32 are de-actuated, in which case the respective actuators 39 and 45 and reference surfaces 36,37 and 42,43 are spaced from the front axle bearings B1 and B3 of the two drums, the drum-support member 32 can be slid forward, off of pins P1 and P3 and along track 59, from its operative position (in which openings 35A and 35B surround bearings B1 and B3), to an intermediate standby position in which member 32 is located substantially forward of the plane of front frame plate FP (as shown in FIG. 3), and substantially spaced from the forward ends of the drums. Thereafter, member 32 can be pivoted 180 degrees about pivot pins 54,55 to a final standby position, shown in FIG. 5. In this position, both drums can be accessed for removal of their respective outer layers. The image-recording drum can have a photoconductive sleeve that is replaceable while the drum shaft is still physically attached to the printer frame. The image-transfer drum can also have an outer adhesive layer is easily replaceable while the drum mandrel is still physically attached to the printer frame.

Referring to FIG. 6B, rear drum support member 32,' like member 32, also comprises a "figure eight"—shaped housing 60. Housing 60 is provided with a pair of holes H2 and H4 for receiving the reference pins P2 and P4 extending inwardly from the front side of the rear frame plate RP. Hole H2 is circular and only slightly larger in diameter than pin P2, whereas hole H4 is slightly elongated to facilitate mounting on pin P4 once pin P2 has engaged hole H2. As noted above, the rear drum-support is rigidly connected to the rear frame plate by bolts or the like. Once in place, the rear drum-support member 32' remains stationary. The upper opening 61 of the figure-eight housing 60 serves to rotatably support the rear axle A2 of the image-recording drum, whereas the lower opening 62 serves to rotatably and releasably support the rear axle A4 of the image-transfer drum. Upper opening 61 has a small circular through aperture 63 through which the free end of rear axle A2 projects. Surrounding aperture 63 is a circular recess 64 adapted to receive an inner portion of axle A2 of somewhat larger diameter than that projecting through aperture 63. A circular recess 65 with a chamfered edge 65A surrounds recess 64 and is adapted to receive a ball bearing B2 mounted on rear axle A2. It will be noted that bearing B2 is the only one of any of the four drum bearings B1–B4 to remain fixed in space within either drum support.

Positioned in the lower opening 62 of housing 60 is a pair of reference surfaces 66,67 for precisely locating the rear axle bearing B4 carried by the rear axle A4 of the image-transfer drum 16 so that a desired image-transfer nip can be attained between the respective outer surfaces of drums 12 and 16. Surfaces 66,67 cooperate with the movable actuator 68 of a selectively energizable air cylinder AC4 to position the rear axle bearing of the transfer drum in the V-notch defined by surfaces 66,67. Bearing B4 is contained in a carriage 70 that is movably mounted within the lower opening 62 of the rear drum-support member 32'.

Referring to FIGS. 7–10, the direction of movement of carriage 70 is controlled by all three pairs of guide rollers 72, 72', 74,74' and 76, 76', that are rotatably mounted on the carriage. These guide rollers ride atop the front and rear surfaces of member 32' and limit movement of drum 16 so as to maintain a parallel relationship between the respective axes of rotation of drums 12 and 16. An L-shaped bracket 78 mounted on the front side of the drum-support member 32' assures that roller pairs 72, 72' and 74,74' maintain contact with the front surface of member 32 and thereby prevent drum 16 front tipping clockwise, as viewed in the drawings. Note, rollers 72' and 74' are not shown in the drawings, but are located in positions corresponding to rollers 72 and 74, but on the opposite side of the drum axle A4. Further details of the manner in which member 32' supports drum 16 are disclosed in the aforementioned U.S. application Ser. No. 09/574,275.

From the foregoing description of a preferred embodiment, it will be appreciated that an improved apparatus for positioning the various workstations in a document printer/copier has been provided. By virtue of its ability to be selectively de-coupled from and subsequently returned to its operative position with respect to the image-recording and transfer drums, the front drum-support member affords all the advantages of the work station-positioning apparatus disclosed in the aforementioned U.S. application Ser. No. 09/474,352, yet none of the noted disadvantages, in terms of cost and weight.

The invention has been described with reference to a particularly preferred embodiment. It will be apparent, however, that certain modifications can be made without departing from the spirit of the invention, and such modifications are intended to be protected by the following claims.

PARTS LIST

10—printer
12—image-recording drum
14—photoconductive surface
15, 15'—gudgeons
DS—drum shaft
16—image-transfer drum
17—mandrel
18—non-stick sleeve
20—corona charging station
22—optical writer
24—development station
25—pre-clean charger
26—cleaning brush
28—image-transfer drum cleaner
p1–p4—reference pins
H1–H4—mounting holes
FP—front frame plate
RP—rear frame plate
32,32'—front and rear drum-support members, respectively.
34—reference fiducials
35—front drum-support housing
35A,35B—openings in housing 35
A1–A4—drum axles
B1–B4—axle bearings
36,37—reference surfaces
AC1, AC3, AC4—air cylinders
39—actuator
CS—spring
42,43—reference surfaces
45—actuator
46,47—air ports
50—yoke portion
51,52—arms
54,55—pivot pins
58—carriage
59—track
60—housing of rear drum support 32'
61,62—openings in housing 60
63—aperture
64—recess
65—recess
65A—chamfered edge
66,67—reference surfaces
68—actuator
70—carriage
72,72' 74,74',76,76'—guide rollers
78—bracket

What is claimed is:

1. A document printer comprising:

a frame having a drum support member;

a set of mating mechanical fiducials located on said frame and on said drum support member; and a drum axle on said drum having a selectively energizable clamping mechanism.

2. The document printer of claim 1 further comprising said frame having a front frame plate and a rear frame plate with a reference locator attached to said front frame plate at predetermined location to precisely locate said drum support member.

3. The document printer of claim 2 wherein said drum support member further comprises a front drum support member and a rear drum support member that support an image-recording drum having a photo-sensitive outer surface and having a front axle and a rear axle that are opposing and outwardly extending and disposed on an intended axis of drum rotation, each of said front and rear axles supporting a bearing by which said drum is rotatably supportable.

4. The document printer as defined by claim 3 wherein said front and rear drum-support members are also provided with selectively actuatable clamps for releasably and rotatably supporting a pair of axles extending from opposite ends of an image-transfer drum.

5. The document printer of claim 3 further comprising said support member mounted on said frame plate and precisely located thereon by said reference locator, having said selectively energizable clamping mechanism for selectively engaging said bearing on said front drum axle, whereby said drum-support member can either rotatably support said image-recording drum, or be de-coupled therefrom so that the drum can be removed from the printer frame independent of said drum-support member.

6. The document printer of claim 5 wherein said drum-support member is movably mounted on said frame plate for movement between a first position in which said clamping mechanism is positioned to engage the bearing on said front axle of the drum, and a standby position in which said drum-support member is sufficiently spaced from said front axle to enable servicing of the drum.

7. The document printer defined by claim 1 wherein said frame comprises a front frame with a rear frame plate spaced from said front frame plate and having a pair of mechanical references extending therefrom at predetermined locations, and wherein said drum support member further comprising a front drum-support member and a rear drum-support member mounted on said rear frame plate and precisely located thereon by said mechanical references extending from said rear frame plate, said rear drum-support member including (a) a bearing for rotatably supporting said rear axle of the photosensitive drum, and (b) a second set of reference fiducials that cooperate with the reference fiducials on said front drum-support member for locating said at least one work station relative to said photosensitive drum surface.

8. The apparatus as defined by claim 1 wherein said front drum support member is slidably mounted on said frame for (i) movement in a direction substantially parallel to said axis of drum rotation, and (ii) for movement about a pivot axis substantially normal to said axis of drum rotation.

9. A document printer comprising:

(i) a frame including a front and rear frame plates;

(ii) a plurality of reference locators attached to said front and rear frame plates at predetermined locations on each plate;

(iii) an image-recording drum having a photo-sensitive outer surface and having opposing and outwardly extending front and rear axles disposed on an intended axis of drum rotation, each of said front and rear axles supporting a bearing by which said drum is rotatably supportable;

(iv) a plurality of workstations for producing transferable images on the photosensitive outer surface to the drums;

(v) a front drum-support member mounted on said front frame plate and precisely located thereon by at least one mechanical reference extending from said front frame plate, said front drum support member having (a) a selectively actuatable clamping mechanism for selectively engaging the bearing on said front drum axle, whereby said image-recording drum is either supported by said front drum-support member for rotation, or decoupled from said front drum-support member and (b) a set of reference fiducials for locating at least one of said work-stations relative to the drum surface; and (vi) a rear drum-support member mounted on said rear frame plate and precisely located thereon by at least one of said mechanical references extending from said rear frame plate, said rear drum-support member including (a) a bearing for rotatably supporting said rear axle of the photosensitive drum, and (b) a second set of reference fiducials that cooperate with the reference fiducials on said front drum-support member for locating said at least one work station relative to said photosensitive drum surface.

10. The apparatus as defined by claim 9 wherein said front drum-support member is movably mounted on said front frame plate for movement between a first position in which said clamping mechanism is positioned to engage the bearing on the drum's front axle, and a standby position in which the front drum-support member is sufficiently spaced from said front axle to enable servicing of the drum.

11. The apparatus as defined by claim 9 wherein said front and rear drum-support members are also provided with selectively actuatable clamps for releasably and rotatably supporting a pair of axles extending from opposite ends of an image-transfer drum.

12. The apparatus as defined by claim 9 wherein said front drum support member is slidably mounted on said frame for movement in a direction substantially parallel to said axis of drum rotation.

13. The apparatus as defined by claim 9 wherein said front drum support member is pivotally on said frame for movement about a pivot axis substantially normal to said axis of drum rotation.

14. The apparatus as defined by claim 9 wherein said front drum support member is slidably mounted on said frame for (i) movement in a direction substantially parallel to said axis of drum rotation, and (ii) for movement about a pivot axis substantially normal to said axis of drum rotation.

15. The apparatus as defined by claim 9 wherein said clamp is pneumatically operated.

16. For use in a document printer having (i) a frame including a front frame plate;

(ii) a reference locator attached to said front frame plate at predetermined location, (iii) an image-recording drum having a photo-sensitive outer surface and having opposing and outwardly extending front and rear axles disposed on an intended axis of drum rotation, each of said front and rear axles supporting a bearing by which said drum is rotatably supportable, and a (iv) a plurality of work-stations for producing transferable images on the drum's photosensitive outer surface; and a front drum-support member adapted to be mounted on said front frame plate and precisely located thereon by said reference locator, said front drum support member having (a) a set of mechanical fiducials for locating at least one of said work-stations relative to the drum surface, and (b) a selectively energizable clamping mechanism for selectively engaging the bearing on said front drum axle, whereby said front drum-support member can either rotatably support said image-recording drum, or be de-coupled therefrom so that the drum can be removed from the printer frame independent of said drum-support member.

17. The apparatus as defined by claim 16 wherein said front drum-support member comprises an integral yoke adapted to be connected to a carriage slidably mounted in a track mounted on the printer frame, whereby said front drum-support member can be slidably mounted on said front frame plate for movement between a first position in which said clamping mechanism is positioned to engage the bearing on the drum's front axle, and a standby position in which the front drum-support member is spaced forward of said front axle.

18. The apparatus as defined by claim 17 wherein said yoke is adapted to be pivotally mounted on said carriage for movement about a pivot axis substantially normal to said axis of drum rotation.

19. The apparatus as defined by claim 16 wherein said clamp is pneumatically operated.

20. The apparatus as defined by claim 16 wherein said front drum-support member comprises a selectively energizable clamp for selectively engaging a bearing carried on the axle of an image-transfer drum comprising said printer.

* * * * *